Aug. 28, 1962
G. V. MILLER
3,051,043
PROJECTION SYSTEM
Filed Aug. 31, 1959
2 Sheets-Sheet 1
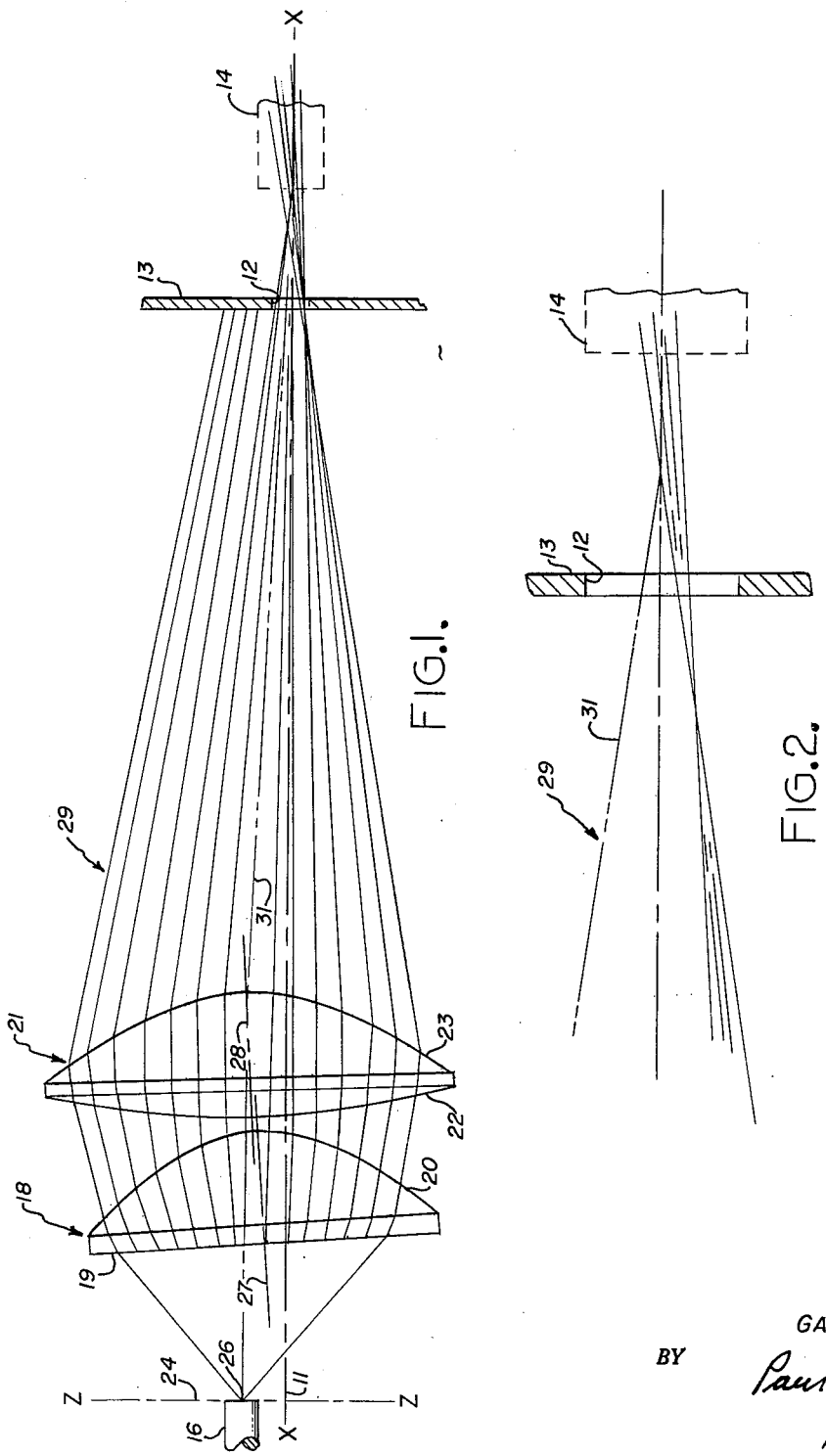
INVENTOR.
GARRY V. MILLER
BY
Paul Bliven
ATTORNEY.

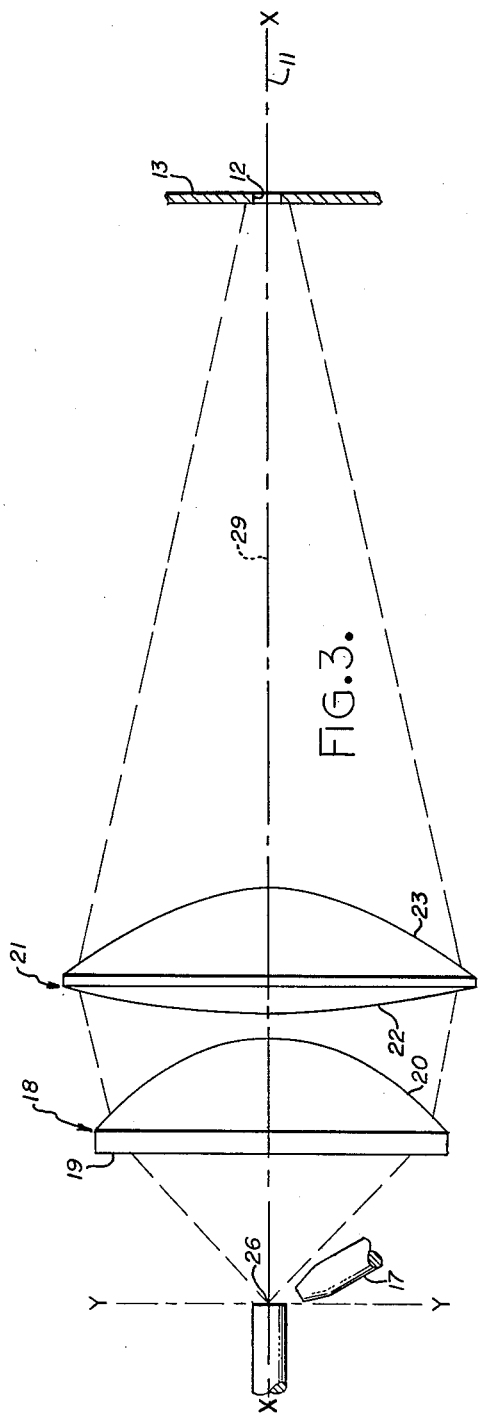
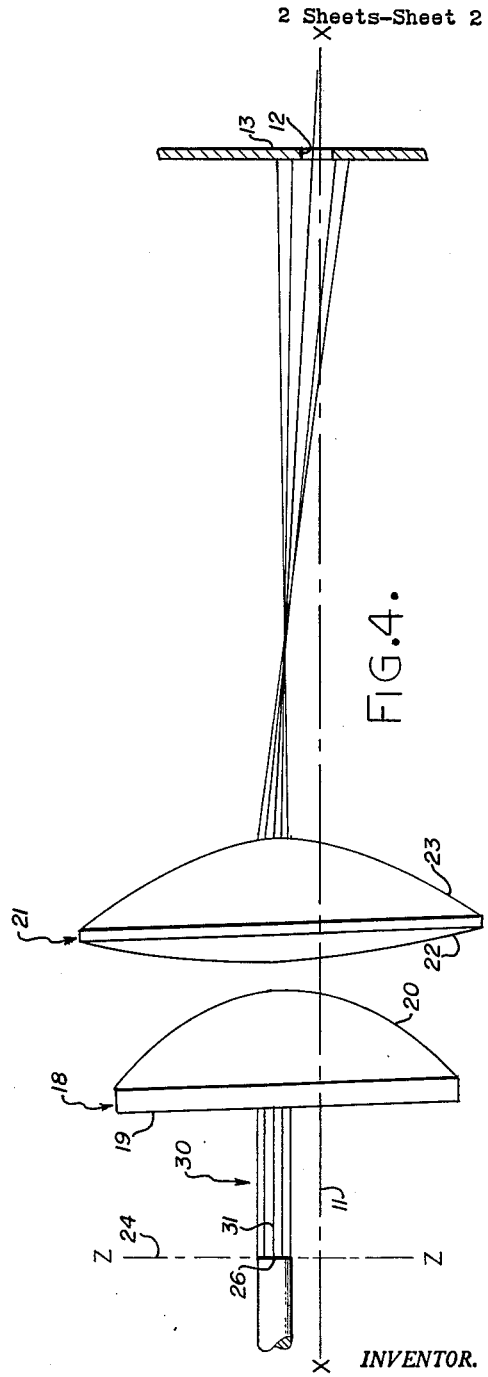
Aug. 28, 1962     G. V. MILLER     3,051,043
PROJECTION SYSTEM
Filed Aug. 31, 1959     2 Sheets-Sheet 2
INVENTOR.
GARRY V. MILLER
BY
*Paul Bliven*
ATTORNEY.

United States Patent Office

3,051,043
Patented Aug. 28, 1962

3,051,043
PROJECTION SYSTEM
Garry V. Miller, 257 Cross St., Salinas, Calif.
Filed Aug. 31, 1959, Ser. No. 836,987
4 Claims. (Cl. 88—24)

The present invention relates to the optics of the projection of picture transparencies, and more particularly to a system for obtaining more light and better light distribution at the transparency and, hence, in its projection.

In the prior devices, such as motion-picture projectures, the crater of a positive carbon of a carbon arc has been used as a light source in connection with condenser lenses between the arc and a picture film, and projection lenses between the picture film and a screen showing the picture projection; and the crater and all the lenses have had a common optical axis. However, such systems have had a light intensity on the picture varying greatly from and symmetrical to a single point on the optical axis at such picture film. This has resulted in not only a concentration of light at the center of the film but, also, in a concentration of heat in a hot spot at the center of the film. This hotspot has limited the amount of light that could be focused on the transparency, as an increase over that allowable resulted in burning of the center of the film.

The need for improvement is particularly felt in the use of large screens in "auto movies" and in "wide angle" projectors.

Applicant has found that by a rearrangment of the relative positions of the carbons and the lenses in the projection lamp house with respect to the aperture in the film plate, he can get better light and heat distribution and more light at the aperture and, hence, on the film and the screen.

Thus, it is an object of the present invention to devise an optical system for a picture projector that will give a better light and heat distribution at the picture film than is possible with a lens system that has all of the system's lens axes coaxial.

Another object of the invention is to increase the film illumination in a projector as compared with the prior art devices.

Another object of the present invention is to achieve such better distribution and increased illumination with a rearrangement of the parts found in the motion picture projector lamp houses now in general use.

The optical system hereinafter described in detail and illustrated in the accompanying drawings was arrived at by trial-and-error, and a complete and satisfactory explanation of its principle of operation has not been achieved. Pencil rays were run thru the system so as to give a good coverage of the condenser lenses and of the film plate aperture; and many of these pencil rays in a plane common to the lenses' axes, are shown in the accompanying drawings, and given in a tabulation herebelow. As to the hypothesis advanced for the results achieved, one holds that the non-coaxiality of the condenser lenses and the carbon crater results in the projection of "two beams," one beam probably due to the parallel, or paraxial, rays from the crater. A second hypothesis is that the comma effect is involved. Light rays passing thru a lens from a source unilateral of the lens axis results in a more or less comma shaped pattern and a doubling, or infolding, of rays; these rays are called skew rays. Also, it would seem to be a good hypothesis that the achieved result is due to a plurality of aberrational effects.

The present invention may be practiced with a standard motion picture projection lamp such as is used at "auto-movies," which has therein carbons for a carbon arc and two condenser lenses, a front condenser lens and a rear condenser lens. In front of and adjacent the lamp housing is a film plate with a film aperture, or gate, therein, and a focusing lens in front of the aperture. The viewing screen is remote from these parts. In such a lamp, it is usual for the longitudinal axis of the positive carbon and the axis of each lens to be coaxial and aligned with the center of the aperture and the axis of the focusing lens, on what is usually called the optical axis of the projection system. The present invention involves moving the longitudinal axis of the positive carbon and its crater from such optical axis and of tilting and moving the two condenser lenses with respect to such optical axis. This gives more light on and distributes both the light and heat more evenly over the aperture and the film therein than when all such elements are coaxial as described for the prior art. This means that the film is less apt to be burned, that there is more uniform illumination thruout the area of the film aperture, or shutter opening, and the total illumination thru the aperture and film may be and is increased to give the better illumination of the screen that is needed for the large screens used in most of the "auto-movies," that is, large as compared with most indoor and the older picture screens.

Having set forth some of the defects of the prior art projection lamps, some of the objects of the present invention, and given a short description of the invention, one embodiment of the invention is hereinafter described in detail and illustrated in the accompanying drawings, in which:

FIGURE 1 is a schematic showing in plan of condenser lenses and light system embodying the present invention, with the light rays of the system emanating from the center of the arc light source.

FIGURE 2 is an enlargement of a portion of FIGURE 1.

FIGURE 3 is an elevational view of the showing of FIGURE 1.

FIGURE 4 is a plan view similar to FIGURE 1 but showing a series of parallel pencil rays emanating from the arc light source.

While the optical system of the drawings is shown schematically, and is hereinafter so described, it represents an actual installation, and the dimensions given hereinafter of that system are dimensional values taken by observation and measurement of such actual installation. The curvature of the lens surfaces given hereinafter may not be precise as they resulted from the making of templates of surface curvature in a diametrical plane of each lens and then matching such templates to a parabolic curve having the given focal length. The relative positions of lenses, positive carbon, film gate, projection lens, and rays, as hereinafter given are the result of not too precise measurements and so may contain some error. However, the error in such measurements is believed to be small. Pencil rays of light having a diameter of about one sixty-fourth inch were passed thru the system, and some of such rays are shown in the drawings. The refractive index of the lenses was calculated from the traces of these rays. At the film gate, the rays were so close together that it was difficult to determine the exact position of each ray but due to the number of rays passed thru the system and the measurement of their locations, the general distribution of the rays was clearly evident, and therefrom, a hypothesis as to the phenomenon involved could be stated.

For the purpose of reference, in the figures of the drawings, an axis 11 has been shown which in the conventional motion picture projector would be the optical axis of the system as such axis would be coaxial with all of the axes of the system's lenses and thru the light source center. In the present system, as in the prior systems, this axis 11 passes thru the center of the film plate aperture 12 and normal to the film plate 13 in which such aperture is formed; and the axis is coaxial of the projection lens and its housing 14. For convenience of reference, in the present showing of the invention this axis 11 is called the aperture, or gate, axis. The face, or cup, of a positive carbon 16 serves as the light source for the system, and such face is removed from the gate axis 11. The face of the positive carbon glows as a result of an electric arc being struck and held between the positive carbon 16 and a negative carbon 17.

There is shown a rear lens 18 having a flat back face 19, the first face, and a front face 20, the second face, with a parabolic surface having a focal distance of 1.5 inches; and a front lens 21 having a back face 22, the third face, with a parabolic surface having a focal distance of 8.0 inches, and front face 23, the fourth face, with a parabolic surface having a focal distance of 2.15 inches. The thickness of the rear lens is 2 inches, and that of the front lens is 2.25 inches. Both lenses have a refractive index of 1.5. The diameter of the rear lens is 6.25 inches, and of the front lens is 7.375 inches. Each lens is a solid piece of glass and all parts of each curved face is shaped to and symmetrical about the axis of the parabola above mentioned for that lens.

The relative locations of the positive carbon 16, the lenses 18, 21, the film aperture 12 and its plate 13, and the projection lens housing 14 may be given in a coordinate system by in FIGURE 1 calling the gate axis 11 an X-axis with a Z-axis 24 at right angles thereto thru the center and back 26 of the arc cup of the positive carbon 16. In FIGURE 1, and herebelow, all of the X-values are positive and to the right of the carbon, and the Z-values are positive and above the X-axis. The cupping of the end of the positive carbon is not shown. If the coordinate system is laid off in a grid with spacings of one-sixteenth inch, the X, Z-coordinates of various points are as follows: the center 26 of the positive carbon cup is (0, 14); the center of the first face 19, the rear face of the rear lens 18, is (45, 8); the center of the third face 22, the rear face of the front lens 21 is (79, 12); the center of the film plate aperture is (327, 0); and the rear face of the focusing lens, as represented by the rear of the housing 14, is (357, 0). In FIGURE 1, the tangential slope Z/X of the axis 27 of the rear lens 18 is 0.0545, and of the axis 28 of the front lens 21 is 0.0391. Both slopes are taken counter-clockwise from the X-axis in FIGURE 1. Each lens axis 27, 28 is its parabolic axis.

As seen in FIGURE 3, a plan view of FIGURE 1, the center 26 of the arc cup of the positive carbon 16; the axes 27, 28 of the condenser lenses 18, 21; and the film plate center are all in the XA-plane of FIGURE 1. The film aperture is rectangular, and on the Y-axis is one-half inch across, as viewed in FIGURE 3, and at right angle thereto, on the Z-axis, as seen in FIGURE 1, it is five-eighths inch across. The positive carbon has a diameter of one-half inch.

The pencil rays of FIGURES 1, 2, and 3 all originate at the center 26 of the positive arc. In the actual location of these rays, each ray went from the arc center to the first face 19 on a diameter thereof in the XZ-plane. One ray went to the center of the face and the others were spaced apart one-eighth inch along such diameter. These rays came thru the fourth face 23 on a line in the XZ-plane, and impinged on the film plate 13 or passed in the XZ-plane thru the aperture 13. Following is a tabulation of the location of these rays at the first and fourth faces and at the film plate. The values given in this tabulation are as they were measured and set down. There has been no averaging or fairing of the values. When these readings, or values, were laid on a full scale drawing of the system, and the ray lines drawn in, it was obvious that there was some error in the observations as the spacing of the rays at the fourth face and at the film plate were uneven, irregular; but, even so, their overall pattern was clear. The light rays of the drawings show this overall pattern. In all the columns of the tabulation, the numbers are eighths of an inch measured from a zero point. In the left hand column, the zero point is at the center of the first face 19. In the middle column, it is at the center of the fourth face 23. In the right hand column, it is at the center of the film plate aperture 12, on the X-axis. Reading in a row across the columns gives the location of a ray at the first face, the fourth face, and at the aperture. For example, the ray which impinges at the center of the first face, at zero, emerges from the fourth face at a minus 5, five-eighths inch to the right of the center of the face, and passes thru the aperture at plus 0.5, one-sixteenth inch to the left of the aperture center. In each column, the numbers above zero are considered to be plus readings and those below zero to be minus readings. The plus readings are for the lenses and the aperture to the left of their centers and the minus readings are far to the right of their centers. Here, "left" and "right" refer to the showing of FIGURE 1, a plan view, if the viewer looks from carbon 16 to film plate 13.

| First face 19 | Fourth face 23 | Aperture 12 |
|---|---|---|
| 22 | 29 | 8.5 |
| 21 | 28 | 8.5 |
| 20 | 27 | 8 |
| 19 | 26 | 8 |
| 18 | 24 | 7.5 |
| 17 | 22.5 | 7 |
| 16 | 21 | 7 |
| 15 | 19.5 | 6 |
| 14 | 17.5 | 5.5 |
| 13 | 16 | 4.5 |
| 12 | 14.5 | 4 |
| 11 | 13 | 3.5 |
| 10 | 11 | 3 |
| 9 | 10 | 3 |
| 8 | 8 | 2.5 |
| 7 | 6.5 | 2 |
| 6 | 5 | 1.5 |
| 5 | 3 | 1.5 |
| 4 | 1.5 | 1 |
| 3 | 0 | 0.5 |
| 2 | 2 | 0.5 |
| 1 | 3.5 | 0.5 |
| 0 | 5 | 0.5 |
| 1 | 6.5 | 0 |
| 2 | 8 | 0 |
| 3 | 10 | 0.5 |
| 4 | 11.5 | 0.5 |
| 5 | 13 | 0.5 |
| 6 | 14.5 | 0.5 |
| 7 | 16 | 0.5 |
| 8 | 18 | 1 |
| 9 | 19.5 | 1 |
| 10 | 21 | 1 |
| 11 | 22.5 | 1 |
| 12 | 24 | 1 |
| 13 | 25 | 0.5 |
| 14 | 27 | 0.5 |
| 15 | 29 | 0.5 |
| 16 | 30 | 0.5 |

The array of rays 29 shown in FIGURES 1 and 2 represent only every third ray of those of the above tabulation. In FIGURE 3, only the ray to the center of the first face and a ray near each edge of the lenses are shown. The rays of FIGURE 1 are all on the X-axis of FIGURE 3, they all go to the center of the lens as shown in FIGURE 3.

In the showing of FIGURE 4, there is shown five rays 30 which are parallel to the X-axis. These rays emanate from the face of the positive carbon 16. The central ray 31 of the five is the ray (3, 0, 0.5) of the above tabulation. This ray 31 is shown in FIGURE 1 as the ray parallel to the X-axis, and there is shown accompanied by some of the other rays which emanate from the same point on the carbon face. Each of the other four rays of FIGURE 3 could be shown with another array of rays similar to the array of FIGURE 1, and which other array would emanate from the point source of light of such other ray. Further, the whole face of the arc cup may be considered to be producing parallel rays, each of which has a radiating array similar to the array of FIGURE 1.

From the tabulation, it will be seen that the rays from the fourth face 23 and above zero are at the film plate 13 spread over a distance of one inch while those from the face below zero are at the aperture spread over a distance of only an eighth of an inch. This concentration, or infolding, of the rays is believed to the the greatest adjacent the XZ-plane and, probably, the rays from adjacent the right hand edge of the front lens are infolded more than those to the left thereof; and that the infolding decreases in the succeeding sectors of the front lens, taken from the XZ-plane in either direction. Thus it will be seen that light is not only brought into the film aperture from the right side thereof but is brought into the aperture from the two adjacent sides thereof.

The view of the light days of FIGURE 1 and the above tabulation shows that light rays which would have been outside of the aperture in the conventional installation are inside the aperture in the present arrangement of carbon, lenses, and aperture. From a comparative inspection of picture projection by the present invention as compared with the conventional arrangement, it is estimated that, with other factors, such as the arc current and voltage being the same, there is about double the amount of light at the aperture and on the projection screen. This increase in the light is had without any increase in the tendency of the film to burn from the heat of the arc. It may be that the present arrangement of the lenses diverts the heat from the aperture while increasing the light concentration. No investigation of infrared radiation deflection has been made. It is believed that this infolding of the light rays is a phenomenon which, in the literature of optics, has been called the comma effect. This effect is present when the light source is removed from the axis of the lens, and is so named because of the shape of the obtained image when the light source is circular in shape.

If the lenses 18, 21 and the face of the carbon 16 are all placed coaxial of the axis 11 as in the conventional installation, and then, if rays are passed thru the system spaced apart one-eighth inch in the XZ-plane on the first lens face 19, only thirteen of the rays will pass thru the aperture 12, those between and including plus (6) and minus (6) on the first lens face. Twenty-one rays pass thrus the aperture 12 from the above tabulation of rays; those between and including plus (4) and minus (16), with a gap of three-sixteenth inch from the last ray to the right edge of the aperture. This gap is filled by the radiation from the parallel rays shown in FIGURE 4.

The increase of and the better distribution of light on the picture screen has resulted in the elimination of flicker. In the conventional installation, the illumination of the edges of the picture has been poor with the result that the persistence of vision was not enough for the senses of a viewer to eliminate the flicker due to the blocking off of light while the film moved from one frame to the next. This doubling of the light and the elimination of flicker has been observed on the screen of an "auto movie" with a picture approximately 100 feet by 40 feet.

Having thus described my invention, an embodiment thereof, and its construction and operation, I claim:

1. In a picture projector: means providing a carbon arc with a carbon end as a source of light, first and second condenser lenses for such light, each lens having its individual axis noncoaxial of the other; a projecting lens system; and a film aperture plate having an aperture between said lenses and said system; said system providing an optical axis passing thru the center of said aperture; the center of said carbon end and all said axes being coplanar; and said carbon center and the axes of said condenser lens being unilateral of said optical axis, whereby light from said carbon end will fall asymmetrically on said aperture.

2. In a picture projector: means providing a carbon arc with a carbon end as a source of light, first and second condenser lenses for such light, each lens having its individual axis noncoaxial of the other; a projecting lens system; and a film aperture plate having an aperture between said lenses and said system; said system providing an optical axis passing thru the center of said aperture; and said carbon center and the axes of said condenser lens being unilateral of said optical axis, whereby light from said carbon end will fall asymmetrically on said aperture.

3. In a picture projector: means providing a carbon arc with a carbon end as a source of light, first and second condensers for such light, each condenser having its individual axis noncoaxial of the other; a projecting system; and a film aperture plate having an aperture between said condensers and said system; said system providing an optical axis passing thru the center of said aperture; and said carbon center and the axes of said condensers being unilateral of said optical axis, whereby light from said carbon end will fall asymmetrically on said aperture.

4. The combination of claim 3 in which the center of said carbon end and all said axes are coplanar.

References Cited in the file of this patent
UNITED STATES PATENTS

| | | |
|---|---|---|
| 1,946,088 | Maurer | Feb. 6, 1934 |
| 1,952,522 | Warmisham | Mar. 27, 1934 |
| 2,819,649 | McLeod et al. | Jan. 14, 1958 |